United States Patent [19]
Gerontakis

[11] 3,944,878
[45] Mar. 16, 1976

[54] VARIABLE BRIGHTNESS LIGHT DISPLAY APPARATUS

[76] Inventor: Basil G. Gerontakis, 32 N. Belmont, Arlington Heights, Ill. 60004

[22] Filed: Nov. 1, 1974

[21] Appl. No.: 519,915

[52] U.S. Cl............ 315/316; 315/185 S; 315/210; 315/314
[51] Int. Cl.².................. H05B 39/00; H05B 37/00
[58] Field of Search............ 315/185 S, 186, 66, 51, 315/69, 211, 217, 226, 314, 315, 323, 362, 316

[56] References Cited
UNITED STATES PATENTS

| | | | |
|---|---|---|---|
| 3,355,627 | 11/1967 | Clement | 315/217 X |
| 3,778,676 | 12/1973 | Keller | 315/217 |
| 3,793,531 | 2/1974 | Ferrigho | 315/185.5 X |
| 3,864,580 | 2/1975 | Davis, Jr. | 315/185.5 X |

*Primary Examiner*—Robert Segal
*Attorney, Agent, or Firm*—Mason, Kolehmainen, Rathburn & Wyss

[57] ABSTRACT

A sequential light flashing circuit usable as a decorative display for Christmas decorations or the like includes a switching circuit for energizing lights in a predetermined sequence to provide a variety of distinct light patterns. A thyristor brightness control circuit is employed in conjunction with the sequential switching circuit to vary the brightness of each light during its operating interval. The operation of the sequential switching circuit may be stopped at any desired point to permit any light pattern in the sequence to be continuously displayed.

17 Claims, 12 Drawing Figures

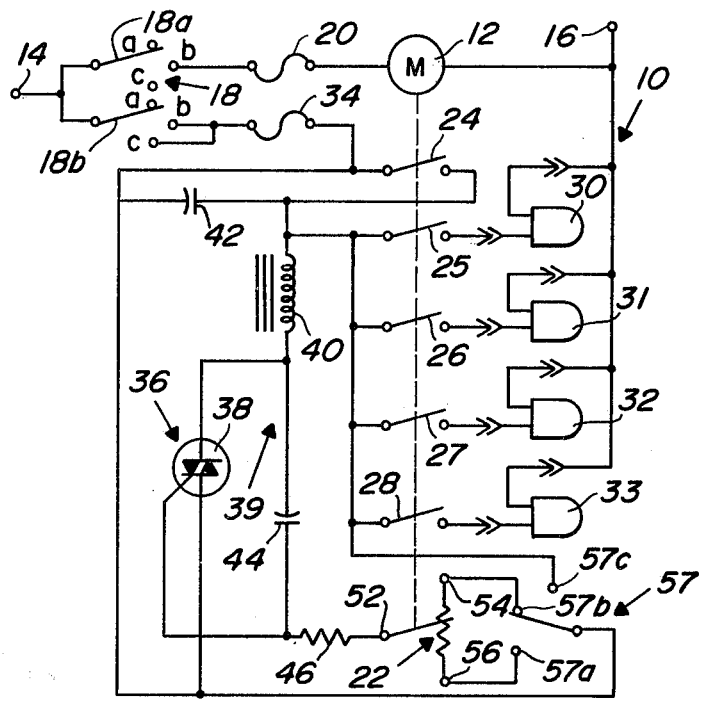
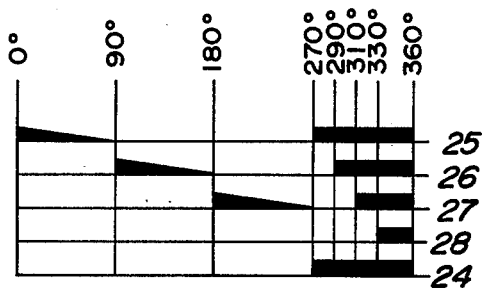
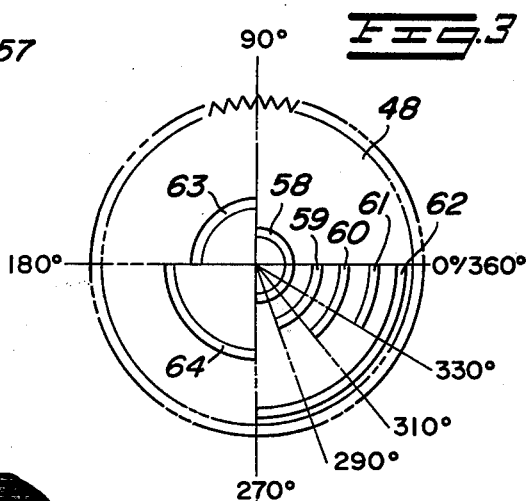
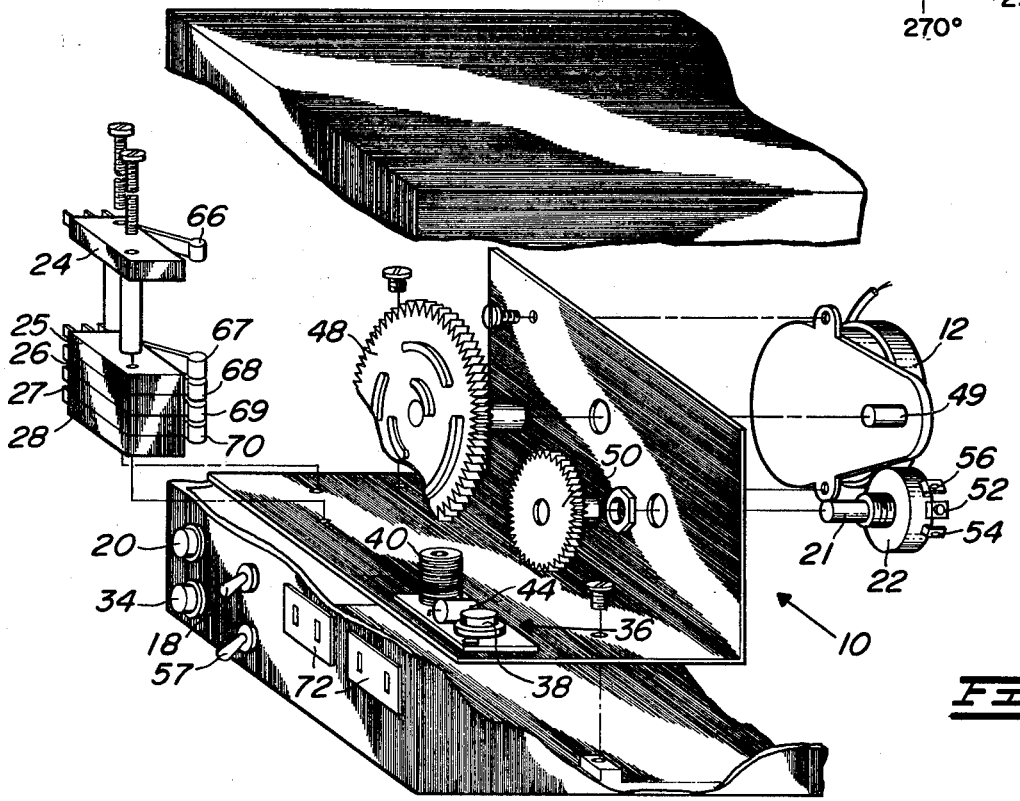

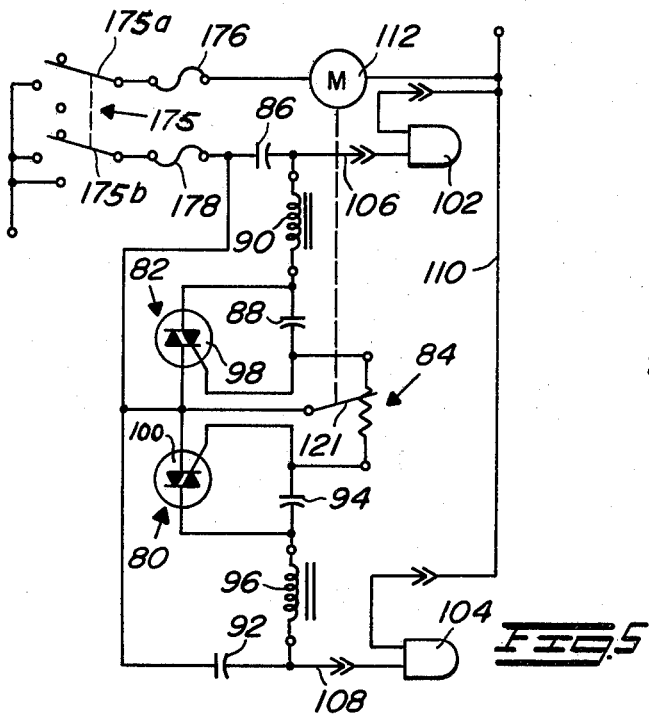
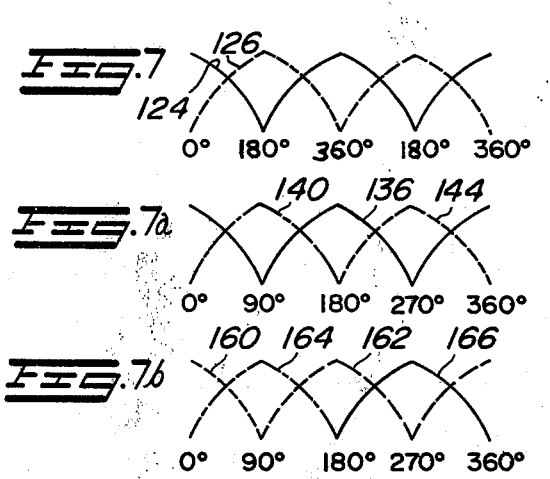
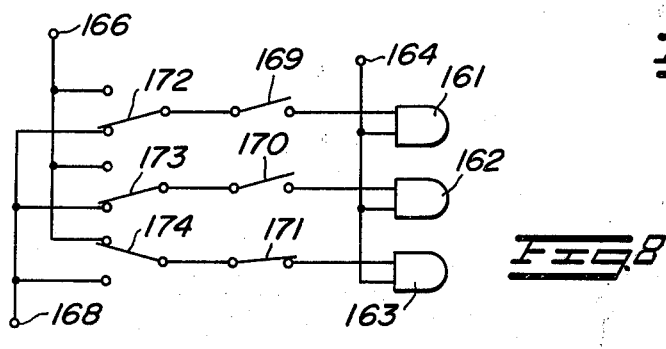
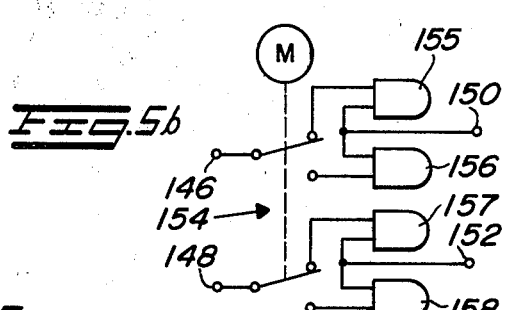
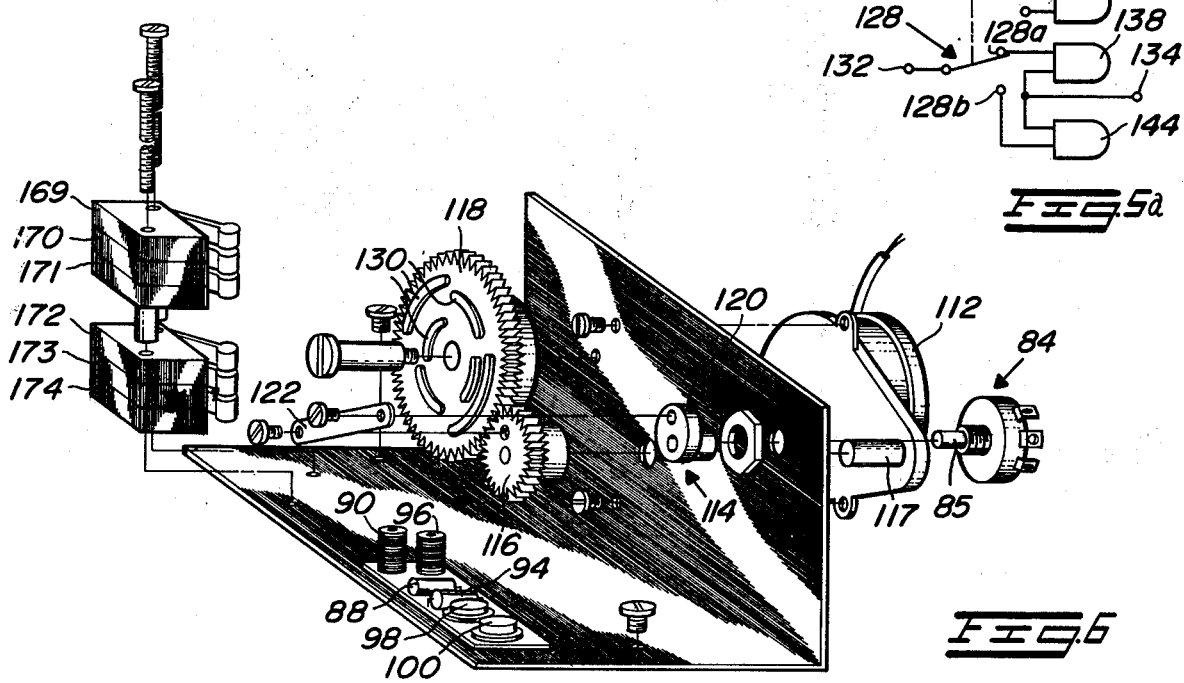

VARIABLE BRIGHTNESS LIGHT DISPLAY APPARATUS

BACKGROUND OF THE INVENTION

A. Field of the Invention

This invention relates generally to sequencing circuits and more particularly to a circuit for sequentially flashing electrical light bulbs or the like in a predetermined sequence and varying the brightness of various ones of the lights at predetermined times in the operating sequence.

B. Prior Art

Several techniques for sequentially flashing a plurality of light circuits are known. These techniques include the use of thermal switches to randomly flash various light circuits and cam operated switches for flashing the various light circuits in a predetermined pattern. Other such circuits utilize a variable resistor in conjunction with the cam operated switches to provide a variable brilliance sequential lighting system. One such system is described in U.S. Pat. No. 3,421,049.

Whereas these techniques provide a way for sequentially flashing a plurality of light circuits, the first mentioned techniques are suitable only for flashing the light circuits at full brilliance. The last mentioned technique has a limited power handling capability due to the power that must of necessity be dissipated in the brilliance controlling variable resistor. All of the above described systems are limited in the number of distinct sequences that can be achieved.

SUMMARY OF THE INVENTION

Accordingly, it is an object of the present invention to provide an improved sequencing circuit for a decorative lighting system.

It is another object of the present invention to provide a light sequencing system having a large number of sequences.

A further object of the present invention is to provide a light sequencing system wherein any pattern in the sequence may be continuously displayed.

It is yet another object of the present invention to provide a light sequencing sequence capable of flashing a plurality of lights at variable brightness without dissipating excessive power.

In accordance with a preferred embodiment of the invention, a thyristor control circuit is provided. A motor driven potentiometer is connected to the thyristor control circuit to vary the amount of power being provided by the thyristor control circuit in a predetermined pattern. A plurality of sequencing switches actuated by a single complex cam member are connected to the thyristor control circuit for sequentially connecting various ones of a plurality of light circuits to the thyristor control circuit. A single electric motor is employed to synchronously drive the thyristor controlling potentiometer and the cam to sequentially energize various ones of the lighting circuits and to vary the brightness of predetermined ones of the lighting circuits during the energizing interval. A switch is provided for de-energizing the electric motor to stop the motor once a desired light pattern has been achieved.

In an alternative embodiment, two thyristors are employed to simultaneously increase the brightness of one lighting circuit while decreasing the brightness of a second lighting circuit. A group of sequencing switches, some of which may be connected in series with one another, is employed to provide a wide variety of lighting sequences. The sequencing switches are also activated by a single cam which is driven by an electric motor that also drives the thyristor controlling potentiometer. As above, a switch is provided in the electric motor energizing circuit for stopping the electric motor once a desired light pattern has been achieved, thereby permitting a continuous display of that light pattern.

Other objects and advantages of the present invention will be apparent from the following detailed description and the drawing in which:

FIG. 1 is a schematic circuit diagram of a preferred embodiment of the sequencing circuit according to the invention;

FIG. 2 is an exploded perspective view showing the mechanical construction of the sequencing circuit according to the invention;

FIG. 3 is a plan view of the switch activating surface of the sequencing cam used in the apparatus of FIG. 2;

FIG. 4 is a graphical representation of the operation of the sequencing switches of the apparatus shown in FIGS. 1 and 2;

FIG. 5 is a schematic circuit diagram of an alternative embodiment of the light sequencing circuit according to the invention;

FIGS. 5a and 5b are schematic circuit diagrams of alternative light sequencing circuits for use in conjunction with the circuit shown in FIG. 5;

FIG. 6 is an exploded perspective view of the mechanical construction of the apparatus according to the invention, part of which is shown schematically in FIG. 5;

FIG. 7 is a graphical representation of the lighting sequence provided by the apparatus shown schematically in FIG. 5;

FIGS. 7a and 7b are graphical representations of the lighting patterns provided by the variations to FIG. 5 shown in FIGS. 5a and 5b, respectively; and FIG. 8 is a schematic circuit diagram of an alternative sequential switching network usable in conjunction with the apparatus shown schematically in FIG. 5 and designed to provide a long complex lighting sequence.

DETAILED DESCRIPTION

Referring now to the drawing, with particular reference to FIG. 1, there is shown one embodiment of the sequencing circuit 10 according to the invention. The sequencing circuit 10 includes a driving motor 12 connected to a pair of alternating current power input terminals 14 and 16 by means of a first pole 18a of a switch 18 and a fuse 20. The switch 18 has two poles 18a and 18b, and is operable to three positions to provide a sequencing display, a continuous display and turn off. The motor 12 drives a shaft 21 of a potentiometer 22 and a series of sequencing switches 24–28. Each of the sequencing switches 25–28 is connected to one of a plurality of lighting circuits 30–33.

Power is applied to the sequencing switches 25–28 by means of the second pole 18b of the switch 18, a fuse 34 and a thyristor control circuit 36. The thyristor control circuit 36 comprises a thyristor 38, in this embodiment a triac, and a phase firing network 39 including an inductor 40, a pair of capacitors 42 and 44, a resistor 46 and the potentiometer 22. The thyristor control circuit 36 is controlled by the potentiometer 22 and serves to vary the amount of power applied to the lighting circuits 30–33 in response to the position of the shaft 21 of the potentiometer 22.

The shaft 21 of the potentiometer 22 is mechanically coupled to the motor 12 by means of a gear train comprising a driving gear 48 coupled to an output shaft 49 of the motor 12, and a driven gear 50 coupled to the control shaft 21 of the potentiometer 22. In the embodiment shown, the diameter of the gear 48 is four times the diameter of the gear 50. The shaft 21 of the potentiometer 22 is continuously rotatable and does not employ any stops, thereby permitting continuous rotation by the motor 12.

The potentiometer 22 has three output terminals 52, 54 and 56. As the shaft 21 of the potentiometer 22 is rotated, the electrical resistance between the terminal 54 and the terminal 52 gradually decreases while the resistance between the terminals 52 and 56 increases at a corresponding rate. As the resistance between the terminals 52 and 54 approaches zero and the resistance between the terminals 52 and 56 approaches its maximum value, subsequent rotation of the control shaft 21 of the potentiometer 22 in the same direction will cause the resistance between the terminals 52 and 56 to increase abruptly to its maximum value and the resistance between the terminals 52 and 54 to reach its minimum value. This action results in a gradual increase (or decrease) in the conduction angle of the thyristor 38, and hence, the brightness of the lighting circuits 31–33 followed by an abrupt decrease (or increase) in the brightness. A switch 57 having contacts 57a, 57b and 57c determines whether the brightness of the lighting circuits is gradually increased followed by an abrupt decrease or gradually decreased followed by an abrupt increase, as described in a subsequent portion of the specification. In the position illustrated, the switch 57 will provide a display having a gradually increasing brightness followed by an abrupt decrease. In the embodiment shown, the cam faces 58–64 are formed as arcuate raised portions on the face of the gear 48, but recessed portions may also be used.

The cam faces 58–64 periodically engage a plurality of levers 66–70 for sequentially actuating the switches 24–28. The sequential actuation of the switches 25–28 sequentially actuates each of the lighting circuits 30–33 while the brightness thereof is varied. Actuation of the switch 24 provides a full brightness display of the ones of the lighting circuits 30–33 corresponding to actuated ones of the switches 25–28.

The switches 25–28 are each connected in series with the thyristor control circuit 36 and one of the lighting circuits 30–33. The switches 25–28 are sequentially operated and apply power to the lighting circuits 30–33, the amount of power applied being dependent on the position of the shaft 21 of the potentiometer 22. As a result, the lighting circuits 30–33 are sequentially energized and the brightness of each lighting circuit is varied during its sequence by the rotation of the shaft 21 of the potentiometer 22. The sequencing switch 24 serves to bypass the thyristor control circuit 36 when closed and applies full power to the switches 25–28 for flashing the lighting circuits 30–33 at full brightness.

The operation of the switches 24–28 is represented by the diagram shown in FIG. 4. A dark horizontal bar represents the actuation of each of the switches 24–28. The thickness of the bar represents the amount of power being applied to each of the switches, and hence the brightness of the associated lighting circuit. The numbers at the right of the graph indicate the reference number of the switch being actuated.

The cam for actuating each of the switches 24–28 is illustrated in FIG. 3. The cam faces 58–64 are arranged, for purposes of illustration, to provide the switching sequence illustrated in FIG. 4 when the switches 24–28 are stacked on top of each other with the switch 25 being engageable by the cam face 58; the switch 26 being engageable by the faces 59 and 63; the switch 27 being engageable by the faces 60 and 64; the switch 28 being engageable by the face 61; and the switch 24 being engageable by the face 62. If such a cam were employed, the switches 24–28 would be stacked on the bottom of the housing. The switch 25 would be located on the top of the stack, the switch 24 on the bottom and the switches 26–28 would be located between the switches 25 and 24. This is unlike the arrangement shown in FIG. 2 where, for practical reasons, the switch 24 is mounted away from the switches 25–28. Accordingly, the cam face in the embodiment of FIG. 2 corresponding to the cam face 62 must be repositioned for engaging the remotely mouned switch 24 at the same time the cam face 62 would engage the stack mounted switch 24.

For the following discussion we shall assume stack mounted switches and that the gear 48 is initially positioned in its 0° position with the switch 25 being engaged by the cam face 58 and no other switch being engaged. As the gear 48 begins to rotate in a clockwise direction, the switch 25 remains engaged until the gear 48 is rotated to its 90° position. Because of the four-to-one gear ratio between the gears 48 and 50, the shaft 21 of the potentiometer 22 is rotated 360° during the 90° rotation of the gear 48. As a result, the conduction angle of the thyristor 38 is gradually reduced and the power applied to the switch 25 is reduced. The brightness of the lighting circuit 30 is therefore reduced from its maximum brightness to its minimum brightness during the 90° rotation of the gear 48. This is illustrated by the reduction in the width of the dark line between 0° and 90° in the graph illustrated in FIG. 4. If the switch 57 were positioned with its armature contacting contact 57a, the lighting circuit 30 would initially be energized at low brightness (low conduction angle of thyristor 38) and gradually increased until maximum brightness (maximum conduction angle) were reached at the 90° point of the gear 48. Moving the armature of the switch 57 to contact 57c bypasses the thyristor control 36 and energizes the lighting circuits 30–33 at full brightness.

As the gear 48 rotates from its 90° to its 180° position, the switch 26 is engaged by the cam face 63, and the switch 25 is opened. This results in the lighting circuit 31 being energized with gradually decreasing brightness as shown by the decreasing width bar between 90° and 180° in FIG. 4. Similarly, between 180° and 270°, the switch 27 is engaged by the cam face 64 to energize the lighting circuit 32. As in the case of the lighting circuit 30, the lighting circuits 31 and 32 may be continuously energized at full brightness or with a gradually increasing brightness depending upon the setting of the switch 57.

As the gear 48 is rotated to its 270° point, the switches 24 and 25 are simultaneously engaged by the cam faces 62 and 58, respectively. The engagement of the switch 24 by the cam face 62 causes the switch 24 to close and to bypass the thyristor control circuit 36. As a result, full power is applied to the switches 25–28, and the lighting circuit 30 is energized at full brightness upon the closing of the switch 25. Further rotation of the gear 48 causes a sequential engagement of the switches 26, 27 and 28 at 20° intervals to sequentially energize the lighting circuits 31, 32 and 33 at full brightness until all four lighting circuits are simultaneously energized at full brightness over the range of rotation of the gear 48 between 330° to 360°. After the 360° point has passed, the switch 24 is again opened and the sequence is repeated beginning with the energization of the lighting circuit 30. The speed of the sequence is determined by the speed of the motor 12 which can be selected to provide a pleasing display. Typically, this can be selected to provide a duration of several seconds for each portion of the sequence.

In addition to the various modes of operation provided by the switch 57, which allows a constant brightness illumination and increasing or decreasing illumination sequences to be programmed, the switch 18 permits sequential or variable fixed lighting patterns to be programmed. The switch 18 is a double pole three position switch having poles 18a and 18b. With the switch positioned as shown in FIG. 1 with the armatures of the switch 18 contacting the uppermost contacts a, the device is turned off. When the armatures are brought into contact with the central contacts b, power is applied to the motor 12 and to the thyristor control circuit 36, thereby resulting in the sequential variable lighting display previously described. Moving the armatures of the switch 18 into contact with the lower contacts c, causes the motor 12 to be deenergized but power to the thyristor circuit 36 to be maintained. As a result, the pattern being displayed when the armatures of the switch 18 are moved from the contacts b to the contacts c will be maintained, and any one of the lighting displays of the sequence may be maintained indefinitely by simply moving the armatures of the switch 18 to the contacts c at the appropriate time. This provides a large number of fixed displays that can readily be changed by advancing the motor 12 to a new position.

Finally, the housing of the sequencing apparatus is provided with a plurality of electrical outlets 72, one for each of the lighting circuits 30–33. Two of the outlets 72 are shown in FIG. 2. The outlets 72 provide a convenient way for plugging the lighting circuits 30–33 into the sequencing circuit and for rearranging the lighting circuits in the outlets 72 to provide different lighting sequences.

An alternate embodiment of the sequencing circuit according to the invention is shown in FIGS. 5 and 6. The embodiment illustrated in FIGS. 5 and 6 utilizes a pair of thyristor control circuits 80 and 82 that are controlled by a single potentiometer 84 having a control shaft 85. The potentiometer 84 is electrically connected to a pair of phase control circuits comprising capacitors 86, 88 and an inductor 90; and capacitors 92, 94 and an inductor 96 connected to a pair of thyristors 98 and 100, respectively. The thyristor control circuits 80 and 82 are connected to opposite ends of the resistive element of the potentiometer 84 so that as the potentiometer is adjusted to increase the power provided by one of the thyristor control circuits 80 and 82, the power provided by the other of the thyristor control circuits is simultaneously reduced. A pair of lighting circuits 102 and 104 are connected to the thyristor control circuits 82 and 80 by means of a pair of leads 106 and 108, respectively. The other lead of each of the lighting circuits 102 and 104 is connected to a common return line 110.

In the embodiment shown in FIG. 5, the potentiometer 84 is a standard potentiometer, and the shaft 85 has a limited range of rotation of less than 360°. In the embodiment shown, the range of rotation of shaft 85 of the potentiometer 84 is selected to be less than 180°. This limited rotational range is provided by an oscillating drive mechanism 114 (FIG. 6) that is driven by an electric motor 112. The potentiometer drive mechanism 114 comprises a driving gear 116 mechanically coupled to a drive shaft 117 of the motor 112. When sequencing switches such as those illustrated in FIGS. 5a, 5b, 6 and 8 are used, an additional gear 118 having a plurality of cam faces 130 for actuating the sequencing switches is employed. The drive ratio between the gears 116 and 118 is two-to-one, with the gear 116 rotating faster than the gear 118. A crank 120 is connected to the shaft 85 of the potentiometer 84, and a connecting rod 122 is employed to couple the gear 116 to the crank 120. The mounting for the connecting rod 122 is offset from the rotational axis of the gear 116 by a distance equal to less than the length of the lever arm of the crank 120 in order to convert the rotary motion of the gear 116 to an oscillating motion at the crank 120. The range of oscillation of the crank 120 is made compatible with the desired range of rotation of the shaft of the potentiometer 84 so that the shaft of the potentiometer 84 is rotated over its entire range in one direction for each half rotation of the gear 116. As a result, the shaft 85 of the potentiometer 84 is alternately rotated fully clockwise during each half revolution of the gear 116 and fully counterclockwise during the succeeding half revolution of the gear 116.

The energization of the lighting circuits 102 and 104 of the circuit of FIG. 5 is illustrated in FIG. 7 as a function of the degrees of rotation of the gear 116. When the gear 116 is at its 0° position, the potentiometer 84 is adjusted so that the minimum resistance appears between its wiper arm 121 and the gate of the thyristor 98. The resistance between the wiper arm 121 and the gate of the thyristor 100 is at a maximum. As a result, maximum power is applied to the lighting circuit 102 and minimum power is applied to the lighting circuit 104. This is illustrated in FIG. 7 wherein the solid line 124 indicates the energization of the lighting circuit 102 and the dashed line 126 indicates the energization of the lighting circuit 104.

At 0°, the lighting circuit 102 is at maximum brightness and the lighting circuit 104 is at minimum brightness. As the gear 116 rotates, the resistance between the wiper arm 121 of the potentiometer 84 and the gate of the thyristor 98 increases while the resistance between the wiper arm 121 and the gate of the thyristor 100 simultaneously decreases. This results in a decrease in the amount of power applied to the lighting circuit 102 and a simultaneous increase in the power applied to the lighting circuit 104 as illustrated by the drop in the solid line 124 and the increase in the dashed line 126. After the gear 116 has been rotated 180°, the power applied to the lighting circuit 102 is reduced to a minimum while the power applied to the lighting circuit 104 is increased to a maximum. Further rotation of the gear 116 results in an increase in the power applied to the lighting circuit 102 and a simultaneous decrease in the power applied to the lighting circuit 104. This trend continues until the lighting circuit 102 receives maximum power and the lighting circuit 104 receives minimum power at the 360° point of the gear 116. Between 0° and 360° of rotation of the gear 116, the sequence is repeated.

The exact shape of the curves 124 and 126 is determined by the taper of the potentiometer 84 and other factors such as the response of the lighting circuits to electric current. This shape can be tailored to provide the most pleasing visual effects or to provide a constant overall brightness by adjusting the taper of the potentiometer 84.

To provide a more complex lighting sequence, the alternate dimming and brightening circuitry shown in FIG. 5 may be supplemented by a sequencing circuit similar to the sequencing circuit of FIGS. 1 and 2. A simple form of sequencing circuit is illustrated in FIG. 5a. The sequencing circuit of FIG. 5a employs a double throw switch 128 mechanically coupled to the motor 112. In a preferred embodiment, the switch 128 having contacts 128a and 128b may be mounted to the chassis of the sequencing circuit in a manner similar to the mounting of the switches 24-28 of FIG. 2, and may be actuated by one or more cam faces such as the cam faces 130, similar to the cam faces 58-64, on the face of the gear 118. For example, in a simple embodiment, a single cam face may be employed to alternately reposition the switch 128 between contacts 128a and 128b after every 180° of rotation of the gear 118.

The circuit shown in FIG. 5a may be connected into the circuit of FIG. 5 by connecting the lighting circuit 102a in place of the lighting circuit 102, and by connecting the terminal 132 to the lead 108 and the terminal 134 to the lead 110 in place of the lighting circuit 104. When this is done, the lighting circuit 102a will be energized in a similar fashion to the energization of the lighting circuit 102 as shown by the solid line 136 in FIG. 7a. With the switch 128 positioned as shown in FIG. 5a with the armature in contact with the contact 128a, a lighting circuit 138 will be energized between 0° and 180° of rotation of the gear 118. This is shown by the alternating dotted and dashed line 140 in FIG. 7a. During the range of rotation between 180° and 360° of the gear 118, the armature of the switch 128 will contact the contact 128b, and a second lighting circuit 144 will be energized as shown by the dashed line 144 in FIG. 7a.

An even more complex sequence can be provided by the circuit shown in FIG. 5b. The terminal 146 of the circuit of FIG. 5b may be connected to the line 106 of FIG. 5, a terminal 148 may be connected to the line 108 and a pair of terminals 150 and 152 may be connected to the line 110. A double pole double throw switch 154 is used to alternately connect one of a pair of lighting circuits 155 and 156 to the terminal 146 and one of a pair of lighting circuits 157 and 158 to the terminal 148. As a result, the lighting circuit 155 is first energized as shown by the short dashed line 160 in FIG. 7b, followed by the energization of the lighting circuit 156 after 180° of rotation of the gear 118 as shown by the long dashed line 162. Simultaneously, the lighting circuit 157 is initially energized between 0° and 180° of rotation as shown by the alternate dotted and dashed line 164 followed by the energization of the lighting circuit 158 between 180° and 360° as shown by the solid line 166. Alternatively, the double pole double throw switch 154 may be replaced by two separate single pole double throw switches and more complex cam faces to permit the switching between the lighting circuits 157 and 158 independently of the switching between the lighting circuits 155 and 156 to provide a still more complex lighting sequence.

A sequencing circuit for providing an even more complex sequence is shown in FIG. 8. In the circuit shown in FIG. 8, each of a plurality of lighting circuits 161, 162 and 163 may be selectively energized by either one of the thyristor control circuits 80 and 82. The circuit illustrated in FIG. 8 includes a terminal 164 connectable to the lead 110 of FIG. 5, a terminal 166 connectable to the lead 106 and a terminal 168 connectable to the lead 108. Three single pole on-off switches 169, 170 and 171 are connected to the lighting circuits 161, 162 and 163, respectively. Each of the switches 169, 170 and 171 is connected to the common terminal of one of a plurality of single pole double throw switches 172, 173 and 174. One of the contacts of each of the switches 172, 173 and 174 is connected to the terminal 166 for connection to the thyristor control circuit 82 and the other of the contacts of each of the switches is connected to the terminal 168 for connection to the thyristor control circuit 80. The switches 169-174 are shown in FIG. 6 and are actuated by the cam faces 130 of the gear 118. The lower three switches 172, 173 and 174 (FIG. 6) are used to alternately couple the lighting circuits 161, 162 and 163 to one of the thyristor control circuits 80 and 82 so that the gradually increasing brightness characteristic followed by a gradually decreasing brightness characteristic provided by each of the thyristor circuits need not be followed, and to provide a greater variety in the brightness characteristics obtainable. For example, one of the lighting circuits may be switched abruptly from a maximum brightness to a minimum brightness by switching one of the switches 172, 173 or 174 when one of the thyristor circuits providing maximum power and the other is providing minimum power. Alternatively, the switching may be done at a time when both thyristors are providing similar power to provide a brightness sequence ranging from a maximum (or minimum) brightness to an intermediate brightness. Other brightness variations are possible by switching the sequencing switches 172, 173 and 174 at other intermediate times of the brightness cycle.

The switches 169, 170 and 171 serve as on-off switches for disconnecting the lighting circuits 161, 162 and 163 from the thyristor control circuits so that one, two or three of the lighting circuits may be energized at various times to increase the complexity of the lighting sequence.

Finally, as in the case of the circuit of FIG. 1, the apparatus shown in FIGS. 5 and 6 can provide a stationary display of any one of the light patterns displayed in any sequence. This is accomplished by means of a switch 175 similar to the switch 18 of FIG. 1. As in the case of FIG. 1, the switch 175 is a three position double pole switch (poles 175a and 175b) having an off position, a sequencing display position wherein power is applied to the drive motor 112 and the thyristor control circuits through a pair of fuses 176 and 178, and a stationary display position wherein power is applied to only the thyristor control circuits to provide a stationary display of the pattern being provided when the power to the motor 112 was turned off.

Although the present invention has been described in conjunction with the embodiments illustrated in the accompanying drawings, it should be understood that modifications to the illustrated embodiments by one having skill in the art can be effected within the scope and spirit of the invention as defined in the appended claims.

What is claimed as new and desired to be secured by Letters Patent of the United States is:

1. A sequencing device for applying power from a power source to a plurality of electrical lighting circuits comprising:
   a thyristor having main terminals connectable in circuit with said power source and said electrical lighting circuits, and a control terminal;
   a plurality of sequencing switches each connected in circuit with said thyristor and one of said lighting circuits for selectively connecting one of said lighting circuits in circuit with said thyristor;
   a variable impedance element electrically coupled to said control terminal for varying the flow of current through said main terminals; and
   sequencing means operatively coupled to said variable impedance element and to said sequencing switches for simultaneously varying the impedance of said variable impedance element and selectively connecting said thyristor in series with predetermined ones of said electrical lighting circuits in a predetermined sequence.

2. A sequencing device as recited in claim 1 wherein said variable impedance means includes a variable resistor and said sequencing means includes an electric motor mechanically coupled to said switches and said variable resistor.

3. A sequencing device as recited in claim 2 wherein said sequencing means includes a disc shaped cam member having a plurality of arcuate cam surfaces engageable by said switches disposed on a major surface thereof.

4. A sequencing device as recited in claim 3 further including means for independently applying power from said power source to said thyristor and said electric motor, said power applying means being operative to a first state for applying power to both said thyristor means and said electric motor, and to a second state for applying power only to said thyristor.

5. A sequencing device for driving a plurality of lighting circuits in a decorative lighting display comprising:
   a thyristor having main terminals and a control terminal;
   means connected in circuit with one of said main terminals of said thyristor for sequentially coupling predetermined ones of said lighting circuits to said thyristor;
   means connected to said control terminal for controlling the conduction angle of said thyristor; and
   a mechanical drive mechanism operatively coupled to said sequential coupling means and said control means for varying the conduction angle of said thyristor between predetermined limits and coupling different ones of said lighting circuits to said thyristor in a predetermined sequence.

6. A sequencing device as recited in claim 5 wherein said conduction angle controlling means includes a potentiometer.

7. A sequencing device as recited in claim 6 wherein said mechanical drive mechanism includes first and second gears having a four-to-one drive ratio for causing said first gear to rotate more slowly than said second gear.

8. A sequencing device as recited in claim 7 wherein said sequential coupling means is mechanically coupled to said first gear and said potentiometer is mechanically coupled to said second gear.

9. A sequencing device as recited in claim 8 wherein said first gear has a plurality of arcuate cam faces disposed thereon.

10. A sequencing device as recited in claim 9 wherein said potentiometer includes a control shaft, and said second gear is affixed to said control shaft for rotation therewith.

11. A sequencing device as recited in claim 10 further including switch means having first and second states connected to said potentiometer, said switch means being operative to cause said potentiometer to gradually increase the conduction angle of said thyristor upon rotation of said control shaft in a predetermined direction when said switch means is operated to said first state, and to gradually decrease the conduction angle of said thyristor upon rotation of said control shaft in said predetermined direction when said switch means is operated to said second state.

12. A sequencing device as recited in claim 11 wherein said switch means has a third state for rendering said lighting circuits nonresponsive to the rotation of said control shaft.

13. A sequencing device as recited in claim 9 wherein said potentiometer includes a control shaft and said device includes crank means affixed to said control shaft and a connecting rod interconnecting said crank means and said first gear.

14. A sequencing device as recited in claim 9 further including a second thyristor, said potentiometer being electrically coupled to said thyristor and said second thyristor for simultaneously increasing the conduction angle of one of said thyristors and decreasing the condution angle of the other one of said thyristors.

15. A sequencing device as recited in claim 14 wherein said sequential coupling means includes multiple position switch means electrically coupled to both of said thyristors for alternately coupling one of said lighting circuits to said first and second thyristors.

16. A sequencing device as recited in claim 15 wherein said sequential coupling means further includes a switch connected in series with said multiple position switch means and one of said lighting circuits.

17. A sequencing device as recited in claim 14 wherein said sequential coupling means includes multiple position switch means electrically coupled to one of said thyristors for sequentially coupling different ones of said lighting circuits to said thyristor.

* * * * *